United States Patent [19]

Sackett

[11] Patent Number: 4,694,161
[45] Date of Patent: Sep. 15, 1987

[54] FLUID FLOW AND LEVEL DETECTOR

[76] Inventor: Robert R. Sackett, 2282 Caminito Pescado #43, San Diego, Calif. 92107

[21] Appl. No.: 794,528
[22] Filed: Nov. 4, 1985
[51] Int. Cl.⁴ .................................................. G01F 1/58
[52] U.S. Cl. ................................. 250/231 R; 250/577; 73/293; 73/861.13
[58] Field of Search ............................... 73/293, 861.13; 250/223 R, 231 R, 561, 577; 350/96.15, 96.20

[56] References Cited

U.S. PATENT DOCUMENTS 2,687,646  8/1954  Goddard ........................ 250/231 R Primary Examiner—Eugene R. Laroche
Assistant Examiner—Steven J. Mottola
Attorney, Agent, or Firm—Frank D. Gilliam

[57] ABSTRACT

The invention is directed to the use of magnets and fiber optics for detecting fluid flow and fluid levels. In general, the invention employs a permanent magnet movable by fluid flow or by the change of fluid levels which directly influences the degree of light transmission between a light transmitting fiber optic cable and a light receiving fiber optic cable. The light can be varied discreetly by shutter means or linearly varied by light reflection determined by distance or by varying the degree of reflection from a reflective surface. The received light information can be used for detectors, indicators, controls or the like.

27 Claims, 16 Drawing Figures

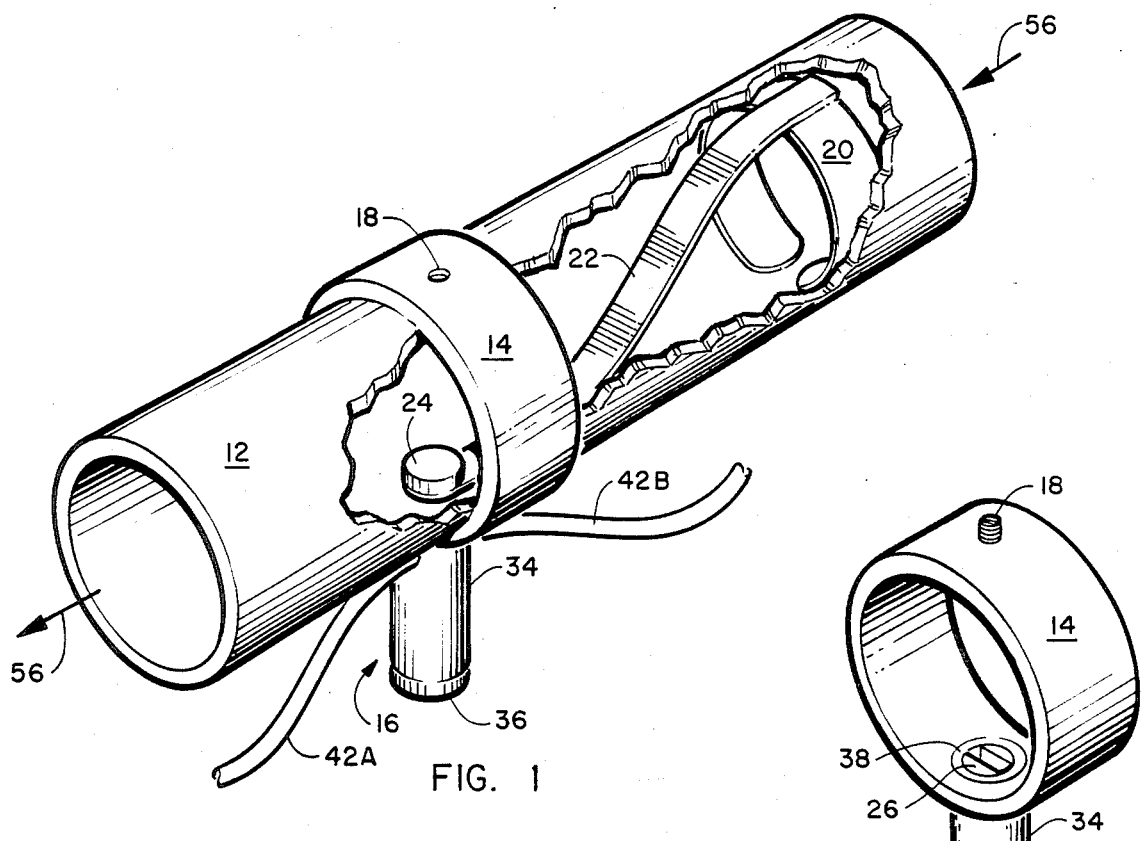
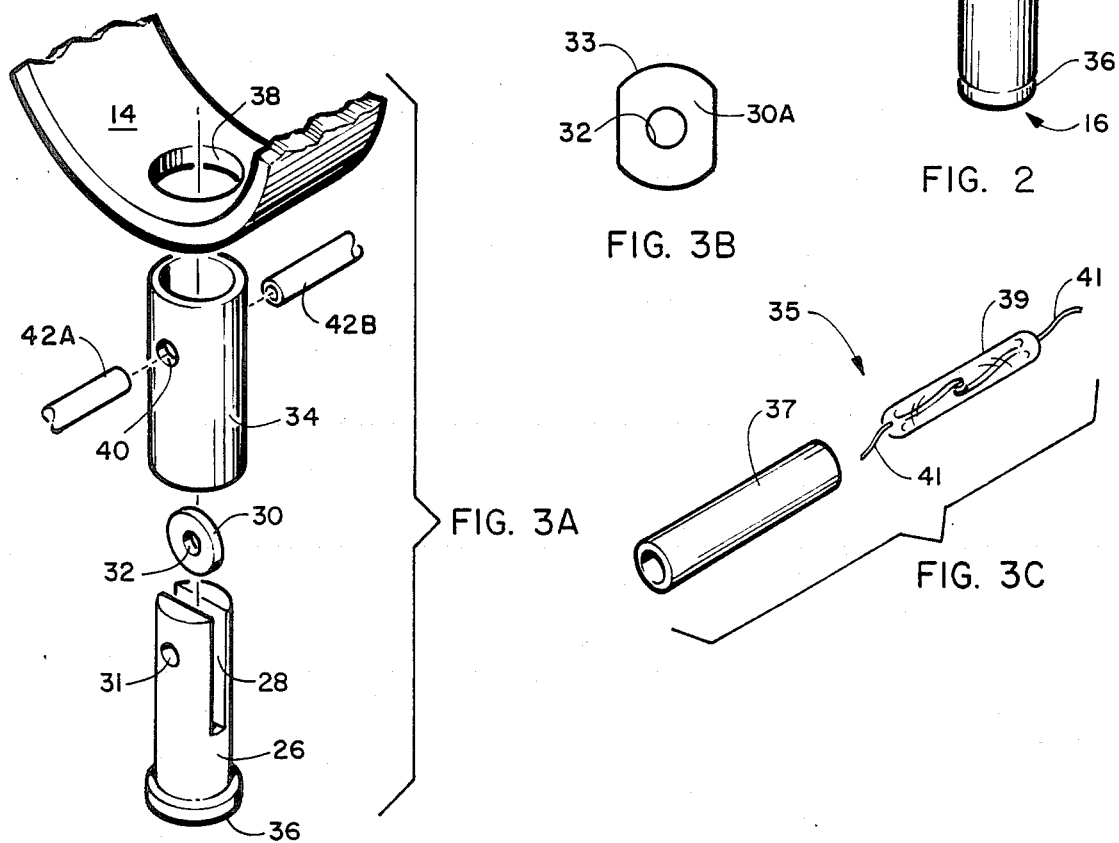

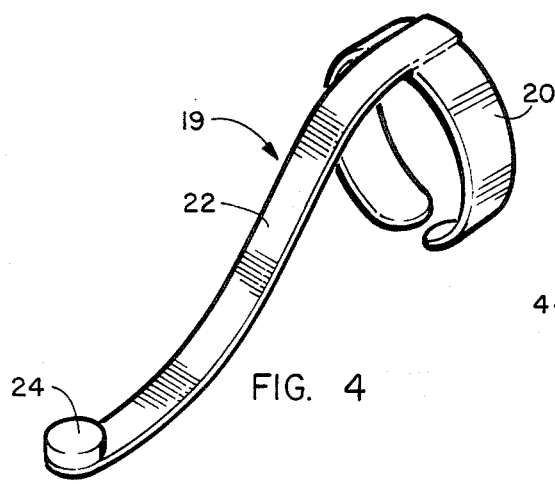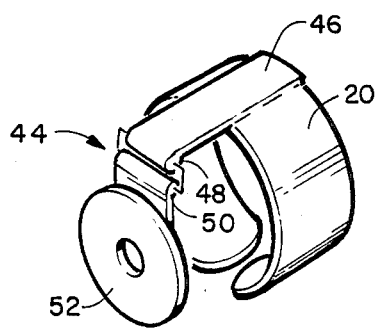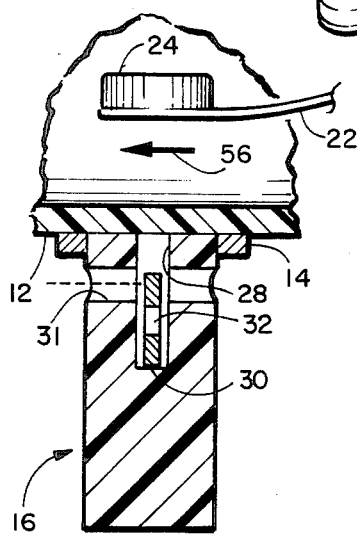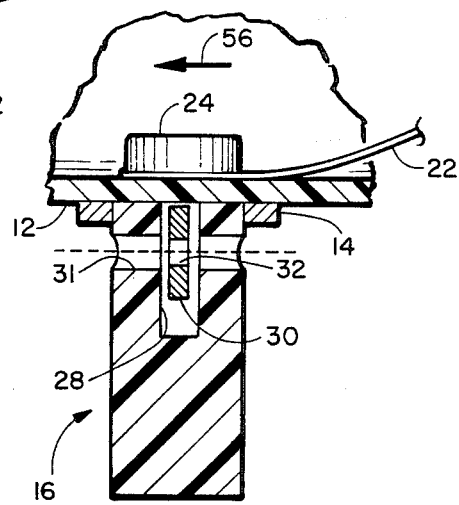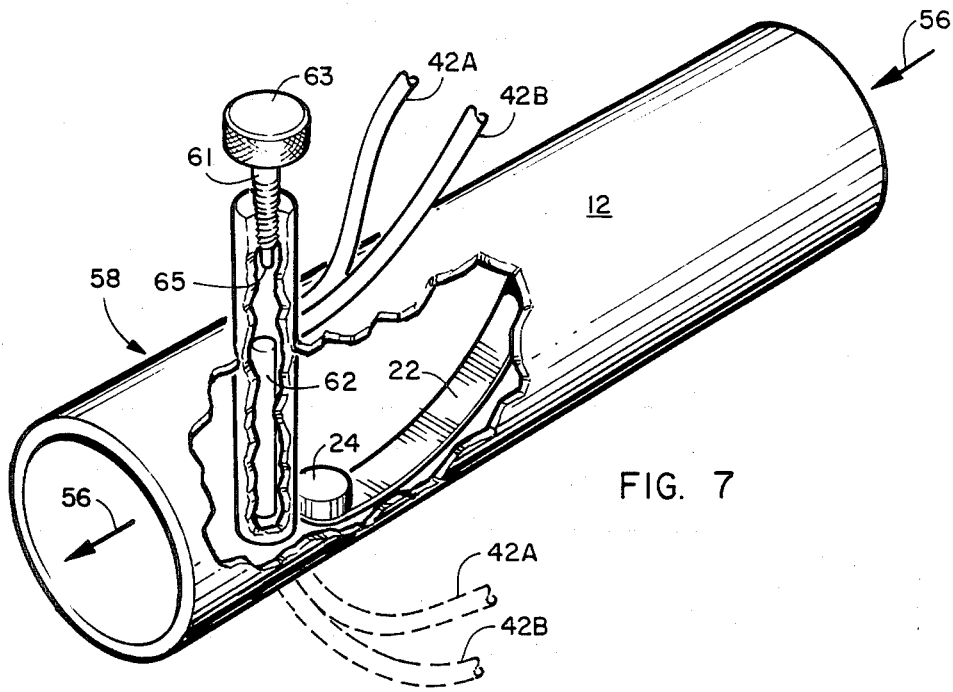

FLUID FLOW AND LEVEL DETECTOR

BACKGROUND OF THE INVENTION

The invention relates to new and improved devices for detecting fluid flow and fluid levels and more particularly to non-electric means employing permanent magnets and photo optic fibers for this purpose.

It is very important for many reasons to monitor the flow of fluids and measure their levels. Motor vehicles employ closed fluid cooling systems and boats employ either closed or open fluid cooling systems for internal combustion engine cooling. Failure of the cooling systems to properly cool the engine could result in engine damage or destruction especially if undetected in sufficient time to terminate engine operation prior to complete engine failure. Overheat warning devices such as temperature gages and lights which react to engine block temperature are ineffective for various reasons, their indications may be present without notice, they may fail due to electrical problems, may not provide sufficient notice to prevent engine overheat problems, may not detect lack of cooling fluid flow, i.e. pump failure or destruction in the fluid flow system, may not detect inadequate water level and the like.

There are many applications where even the presently available flow monitoring devices could be used, but are not used due to cost or remoteness of the device to be monitored, the unavailability of required electrical power for their operations or the like. Such applications include remote oil and gasoline pipe lines, fire sprinkler systems, or any other applications where the flow of fluids and/or their levels are important.

In U.S. Pat. No. 4,524,736, by the inventor of the instant invention an improved means for detecting fluid flow is taught.

The present invention is a further advancement of that type of a flow and level detection system.

SUMMARY OF THE INVENTION

The new system, in accordance with the present invention, includes a relatively simple and effective non-electrical fluid flow and level detection device which utilizes simple inexpensive permanent magnets and fiber optic cables for this purpose. These cables can be extended any finite distance between the detection device of the invention and a remote monitoring station. It is known that light signals can be transmitted many miles through fiber optic cables.

Accordingly, an object of this invention is to provide an inexpensive remotely positionable fluid flow detecting device.

Another object of this invention is to provide a non-electrical device for fluid flow detection.

Another object of this invention is to provide the operating energy for a non-electrical fluid flow detection device from permanent magnets.

Another object of this invention is to provide remote positioning between the fluid flow detecting device and the sensing means by means of fiber optic cables.

Another object of the invention is to provide a device for detecting fluid flow and the volume of that flow between no-flow and maximum expected flow.

Other and further objects of the invention will be obvious upon an understanding of the illustrative embodiments hereinafter described, or will be indicated in the appended claims, and various advantages not referred to herein will occur to one skilled in the art upon employment of the invention in practice.

BRIEF DESCRIPTION OF THE DRAWINGS

FIG. 1 is an elevated partially cut-away perspective showing if one embodiment of the invention;

FIG. 2 is the light sensing assembly of the FIG. 1 embodiment;

FIG. 3A is an exploded view taken along the bottom portion of FIG. 2

FIG. 3B is a second embodiment of the shutter of FIG. 3A;

FIG. 3C is a magnetic sensing device which can be used as an alternate to the light sensing assembly of FIG. 2;

FIG. 4 is the actuating assembly of FIG. 1;

FIG. 5 is a second embodiment of the actuating assembly;

FIG. 6A is a schematic showing of the shutter position of the FIG. 1 embodiment with insufficient fluid flow;

FIG. 6B is a schematic showing of the shutter position of the FIG. 1 embodiment with sufficient fluid flow;

FIG. 7 is a partially cutaway showing of the device of FIG. 1 employing a second embodiment of the light sensing means;

DETAILED DESCRIPTION OF THE INVENTION

Figure 8:
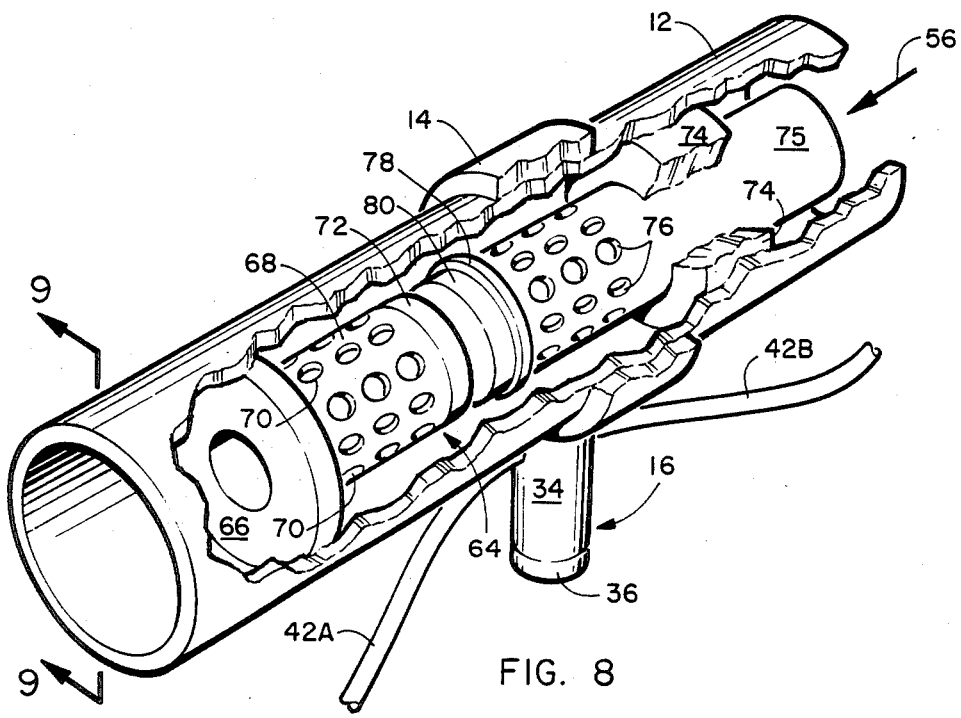
FIG. 8 is a third embodiment of the actuating assembly.

Referring now specifically to drawings of FIGS. 1–4. The first embodiment 10 of the flow indicator is shown. The indicator has an outer housing 12 which is generally tubular in shape and constructed of any convenient non-ferrous material such as, for example and not by way of limitation, copper, brass, plastics, rubber or the like or any other material which does not effect magnetic forces. A ring member 14 housing a light sensing or shutter means 16 is slip fitted to the outer surface of housing 12. The ring member is locked in a selected location on the housing by means of set screw 18. A fluid flow movable member 19 with an open ring 20 is constructed of a resilient material such as spring steel or the like, and has an elongated flexible member 22 attached thereto. The distal end of flexible member 22 has a permanent magnet 24 attached thereto. The permanent magnet 24 is shown attached to the upper surface of the flexible member 22; however, it should be understood that the magnet 24 could also be placed on the lower surface of the flexible member to practice this invention. The open ring 20 is squeezed together and slipped into the end of housing 12. The resilience of the ring causes it to expand outwardly against the inner surface of the housing when released fixing its relative position within the housing. As can be seen in FIG. 1, the permanent magnet 24 is positioned adjacent to the light sensing or shutter means 16 during assembly.

As shown in FIG. 3A, the light sensing or shutter means 16 comprises a central portion 26 which includes an elongated slot 28 for receiving a shutter disk 30 for lateral translation therein and a bore 31. The shutter disk 30 has a central aperture 32 for the passage of light therethrough hereinafter discussed in more detail. An outer sleeve 34 fits over the central portion 26 capturing shutter 30. The outer sleeve 34 rests on collar 36 at the lower end of central portion 36 and is press fit into aperture 38 of ring member 14. The outer sleeve has a bore 40 which is aligned with bore 31 of the central portion during assembly. Actually when properly assembled bore 31 is a continuation of bore 40.

A pair of identical fiber optic cables 42A and 42B are inserted one in each side of bores 40 and 31 and extend to a position adjacent to slot 28. One of the fiber optic cables 42A or 42B transmits light from a remote source and the other receives light for remote transmission.

Referring now to FIG. 3B, the shutter 30A is shown having rectilinear side surfaces 33. This configuration is required when the shutter 30A is a permanent magnet. The surfaces ride closely adjacent to the inner surface of sleeve 34, preventing the shutter from rotating end to end in slot 28. By the positioning of like magnet poles of magnets 24 and 30A adjacent, the device will transfer light between the fiber optic cables in reverse of the operation of the FIG. 3A showing and the same as the FIG. 3A showing when opposite magnetic poles are adjacently positioned.

Referring now to FIG. 3C, a magnetic sensing means 35 is shown. This sensing means 35 is comprised of a tube 37 constructed of non-ferrous material such as, for example, plastic, copper or the like. A magnetically operated switch 39 is positioned within the tube by adhesive means or the like. Obviously the influence of a magnet, for example, magnet 24 (FIG. 1), magnet 52 (FIG. 5) or the like changes the normal state of the switch, i.e., from normally open to closed or normally closed to open. The tube 30 can be attached to the various embodiments of the invention in place of sensing or shutter means 16. The connectors 41 can be placed in series with a voltage line, etc. to operate a selected sensing device. The attachment of the tube 37 to the device of FIG. 1, for example, can be by an adhesive as is the switch 39 to the inside of tube 37.

Referring now specifically to FIG. 5, a second embodiment 44 of the flow movable member 19 is shown. This embodiment includes the open ring member 20 which is used for the same purpose hereinbefore described. Attached to the ring member is a rigid arm 46 which is pivotally connected at 48 to a second rigid arm 50. Attached to the opposite end of rigid arm 50 is a permanent magnet 52 shown as disk shaped like shutter 30 with an aperture 34 centrally located therethrough. The specific shape of magnet 30 is unimportant except that the shape and amount of surface area should be minimized so as to be actuated by fluid flow while not restricting that flow. The size of the aperture 54 determines the flow velocity required to rotate the magnet about pivot 48. It should be pointed out that flow can be detected in the embodiment regardless of flow direction (either in the direction of arrowhead 56 or 57), while in the previously mentioned embodiment only flow in one direction, along arrowhead 56, can be detected.

Referring now to FIGS. 1 and 6A, the device of FIG. 1 operates as follows when a liquid flows in the direction of arrow 56, flexible member 22 and magnet 24 are caused to be elevated from sensing or shutter means 16. The elevated position of magnet 24 causes shutter disk 30 to drop by gravity to the bottom of slot 28 obscuring the light passage through bore 31, 40 from either fiber optic cable 42A or 42B to the other. A conventional light sensing switch or the like remotely positioned on the end, not shown, of either fiber optic cable 42A or 42B senses that the flow in the system is as expected.

Referring now to FIG. 6B, when there is no flow, the influence of magnet 24 which is positioned adjacent shutter disk 30 causes the shutter disk to be elevated against the outer surface of housing 12 thereby aligning aperture 32 with bores 31 and 40 thus allowing light to be transmitted from one of the fiber optic cables 42A or 42B to the other. The light sensing means, not shown, senses the presence of light which provides an indication that flow has terminated.

Referring again to the FIG. 5 embodiment. The flow detecting magnet 52 operates in the same manner as magnet 24. With fluid flow, the magnet is pivoted out of influence with shutter disk 30 and hence no light is transmitted between fiber optic cables 42A and 42B. With no flow, the magnet 52 aligns with shutter disk 30 causing it to elevate, thereby passing light between fiber optic cable 42A and 42B.

Referring now to FIG. 7, in some instances it is important not only to detect fluid flow but to the amount or velocity of that flow. The embodiments of FIG. 1–6 are not suitable for this type of indication.

In the FIG. 7 device, the housing 12 and the assembly 19 including flexible member 22 and magnet 24 are common. In place of sensor 16 a sensor 58 is used.

Sensor 58 comprises a tube 60 which extends throughout the walls of housing 12 in a sealed relationship therewith which is positioned perpendicular with the longitudinal axis thereof. Within tube 60 is a cylindrical permanent magnet 62 which is confined in the hollow central portion of the tube 60 and is free to translate therealong. A clear fluid such as a light oil as for example, may be sealed within the tube along with the cylindrical magnet for translation control or damping of the cylindrical magnet. A pair of fiber optic cables 42A and 42B are positioned so that transmitted light from one is reflected from the body of the cylindrical magnet to the other. In his manner the presence of the magnet adjacent the fiber optic cable ends is sensed. A second sensing means using fiber optic cables 42A and 42B at a different location is shown in phantom. In the phantom location position light is transmitted from either 42A or 42B and reflected off the end of cylindrical magnet 62, which is a highly reflective surface, to the receiving fiber optic cable 42A or 42B. The gradient of reflected light is determined by the distance of the end of cylindrical magnet from the exposed end of the fiber optic cables. The bottom end of the tube 60 is sealed.

The cylindrical magnet 62 may be color graded, that is coated with discrete rings of shades between white and black, such as for example, tones that comply with the MUNSELL VALUE STANDARDS. These tones should, however, not be considered limiting because any color variations could be used to achieve the result desired. A dampening adjustment 61 for controlling the movement of cylindrical magnet 62 is located in the distal end of tube 60. The dampening adjustment includes a knurled knob 63 outside end and a permanent magnet 65 on the inside end. The magnets 62 and 65 have their adjacent magnetic poles the same.

The device of FIG. 7 operates as follows: with fluid flow along arrowhead 56 magnet 24 and cylindrical magnet 62 are positioned as shown. In this configuration, minimum or no light is transmitted between fiber optic cables 42A and 42B indicating a no flow condition and maximum light will be transmitted between the phantom positioned fiber optic cables 42A and 42B indicating a no flow condition. As fluid flow along arrow 56 is initiated, magnet 24 will rise, as hereinbefore discussed, causing cylindrical magnet 62 having the same magnet pole adjacent thereto to rise the same distance. Any change of position of the cylindrical magnet 62 from its FIG. 7 rest position will change the reflected light between 42A and 42B and the phantom positioned 42A and 42B. This light change information may be either linear or non-linear and is used as an input to a remote sensor and control means not shown.

Figure 9:
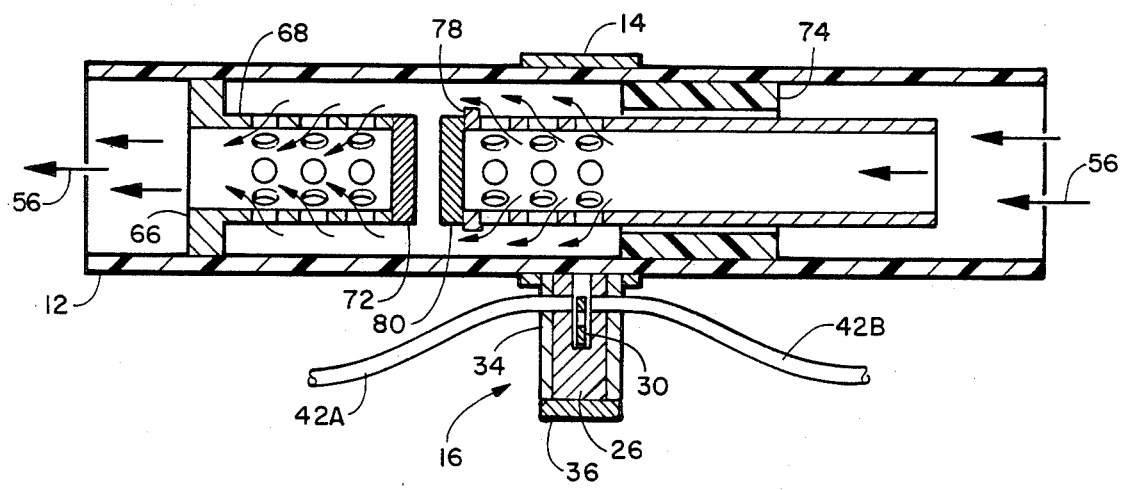
FIG. 9 is a side showing taken along line 9—9 of FIG. 8.

FIGS. 8 and 9 depicts a third embodiment of a flow censoring device 64 of the invention. Like the sensing device 19 of FIGS. 1 and 4, flow can be sensed in only one direction (along arrowhead 56). A housing 12 and a light sensing or shutter means 16, as hereinbefore discussed is included. The flow sensing device 64 comprises an upstream portion 66, fixedly mounted in the inner up stream portion of the housing 12, a reduced diameter hollow downstream portion 68 which has a plurality of rows of apertures 70, a permanent magnet 72 on its downstream distal end surface; a downstream brushing portion 74 fixed connected to the inner wall of housing 12, an elongated hollow tubular member 75 positioned and freely translatable within the bushing member 74. The upstream portion of the hollow tubular member 75 includes a plurality of rows of apertures 76. The surface area covered by the rows of apertures 76 is substantially equal to the longitudinal length of the bushing member 74 so that when the hollow tubular member 75 is translated downstream by lack of fluid flow and the effect of magnets 72 and 80 wherein ring 78 contacts the bushing's forward surface preventing further translation, the bushing conceals the plurality of rows of apertures. On the distal end of the elongated hollow tubular member 75 is a permanent magnet 80. Permanent magnets 72 and 80 have like adjacent magnetic poles at their outer distal surfaces which repel and translate member 75 downstream in the absence of fluid flow as hereinbefore mentioned.

In operation, without fluid flow in the direction of arrow 56 (phantom showing) the similar magnetic poles of magnets 72 and 80 cause the elongated hollow tubular member 75 to be biased in the direction or arrow 82 with he ring 78 bearing against the upstream left side forward surface of the bushing member 74. In this position the permanent magnet 80 is positioned vertically above shutter disk 30 elevating the disk 30, thereby, allowing light to be transmitted between fiber optic cables 42A and 42B as hereinbefore discussed under the discussion directed to FIG. 6B. In operation with a fluid flow along arrow 56, the fluid flow pressure forces the elongated hollow tubular member to translate in the direction of arrow 56. Depending on the fluid flow force, all three rows of apertures 76 may be translated outwardly from this no fluid flow position under the bushing 74. In this flow position of the elongated hollow member, the fluid flows through the hollow center of the elongated hollow member 75, out apertures 76, through apertures 70 and out the hollow center of the reduced downstream portion 68. the translation of member 75 places the permanent magnet 80 in a position out of alignment with he shutter disk 30 preventing any light transfer between fiber optic cables 42A and 42B as discussed above under the discussion directed to FIG. 6A as aforementioned, the light or lack of light transfer between the fiber optic cables is sensed and used as a control signal.

Figure 10:
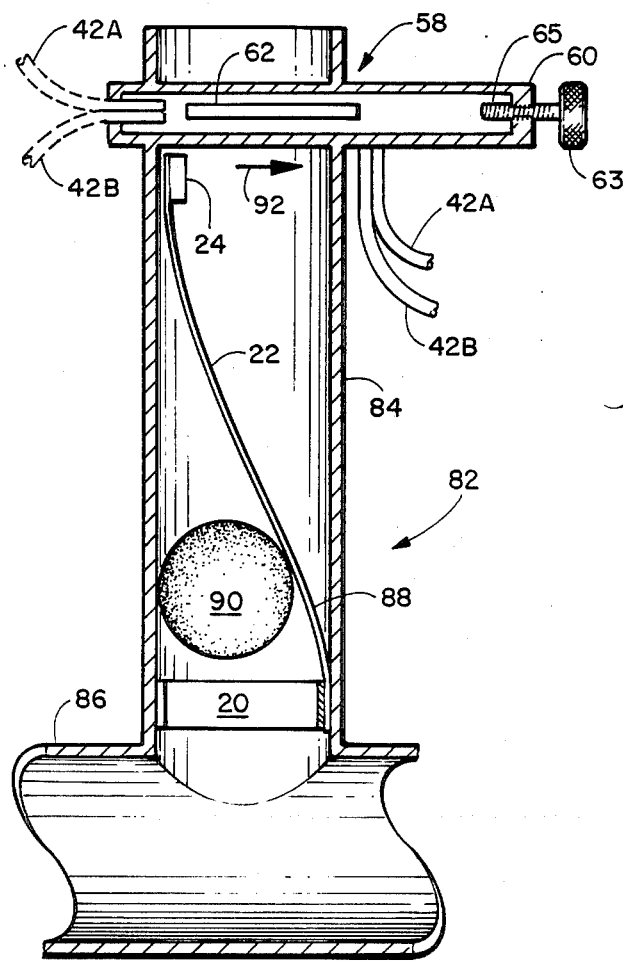
FIG. 10 is a second embodiment of the invention for use in a vertical position.

Referring now specifically to FIG. 10, a vertical flow detecting device 82 is shown. The device includes a vertical housing 84 connected to and communicating with the interior of a housing 86 through which fluid normally flows. Fluid flows through housing 86 in either direction and rises within vertical housing 84 to a degree which is dependent on the force (volume) of fluid flowing through housing 86. Within housing 84 is a fluid level sensing means not unlike flow movable member 19 discussed under the discussion of FIG. 4 above, except that the flexible member 22 is pivotally attached to open ring 20 through pivot point 88 and member or arm 22 is less flexible. A float 90, in the shape of a sphere, is positioned within housing 84 and is trapped between member or arm 22 and open ring 20 and normally rests on or near ring 20 in the absence of liquid in the housing. Due to the effect of gravity, member 22 is positioned diagonal across the housing 84 in the absence of liquid in housing. A similar sensor 58, as hereinbefore discussed under FIG. 7, is positioned through the distal open end of housing 84 and operates in the same manner as hereinbefore discussed.

In operation, with no fluid present in housing 84, the same light indications between fiber optic cables 42A and 42B as discussed above under FIG. 7. In operation with sufficient fluid to elevate in housing 84, float 90 is elevated translating member 22 along the path of arrow 92 wherein permanent magnet 24 moves cylindrical permanent magnet 62 in the same manner as discussed under the operation of FIG. 7. The light transfer between fiber optic cables 42A and 42B is the same as discussed under FIG. 7.

Figure 11:
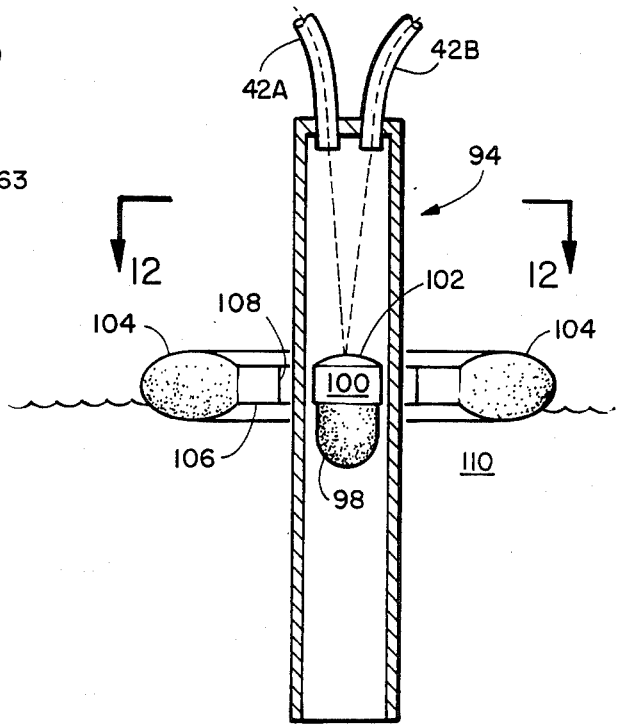
FIG. 11 is a third embodiment of the invention used for fluid level indication.
Figure 12:
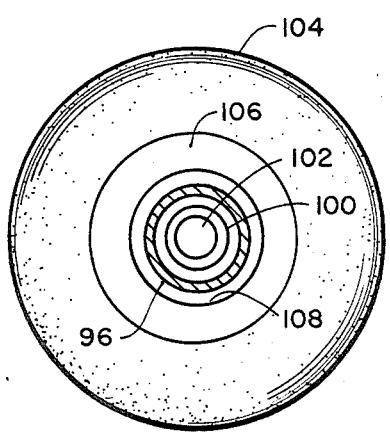
FIG. 12 is a view taken along line 12—12 of FIG. 11.
Figure 13:
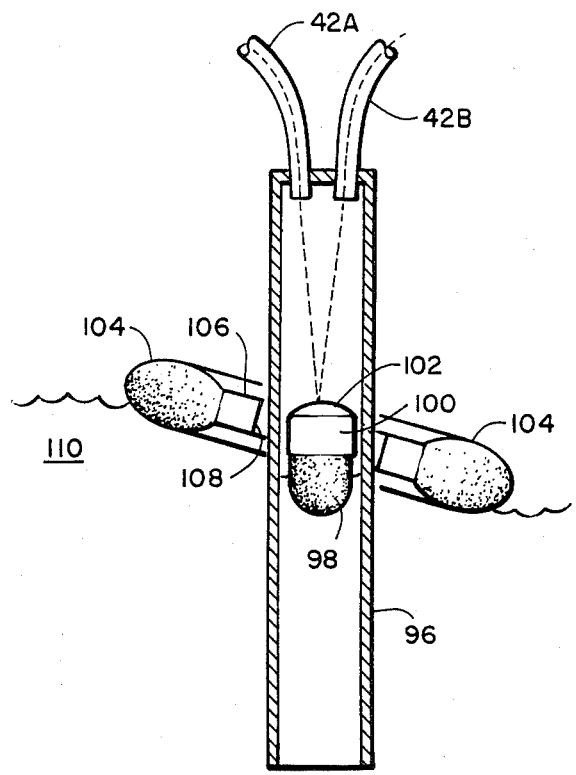
FIG. 13 is a showing of the device of FIG. 11 in operation.

Referring now specifically to FIGS. 11-13 which depict a fluid level measuring device 94. A housing 96 contains a float 98 with a permanent magnet 100 having a reflective upper surface 102 located on the upper surface of the float and the housing is filed with a clear fluid in which the travel of the combined float 98 and permanent magnet is dampened or slowed. At the upper end of the housing 96, a pair of fiber optic cables 24A and 42B pass through the outer housing surface into the housing in a sealed relationship with the housing. A donut shaped float 104 with a centeral permanent magnet 106 is positioned around the housing 96 whereby the magnetic influence of permanent magnet 106 and the magnetic influence of permanent magnet 100 interact. The diameter of the center aperture 108 of permanent magnet 106 is just slightly larger than the diameter of the housing 96.

In operation, the level measuring device is fixedly positioned in a column of fluid 110 and sufficiently emerged therein to measure a range of fluid surface elevations. The elevation of fluid 110 establishes the vertical location of the float 104 and magnet 106 relative to the top and bottom of the housing. The permanent 100 and 106 having different adjacent magnet poles causes the magnet 100 to establish a position adjacent to the magnet 106. Light transmitted from one of the fiber optic cables 42A or 42B is reflected from the reflective surface 102 of magnet 100 to the other fiber optic cable.

Obviously, light reflected in this manner will very in intensity with changes in the vertical position of magnet 100. These light intensity changes are transmitted via one of the fiber optic cables to a remote sensing means (not shown) that translates received light intensity to a vertical fluid level indication.

The relative size of the magnet 106 central aperture and the diameter of housing 96 limits the rotational movement of the donut float and permanent magnet 106 during fluid surface uneveness such as waves etc. As shown in FIG. 13, the magnet 106 binds on the outer surface of housing 96 under uneven fluid surface conditions. This feature along with the dampening fluid within the housing 96 cancels unwanted magnet 100 oscillations which result in continually varying light intensity changes. In the FIG. 13 showing, the housing 96 is fixedly secured to the top surface of a tank 110.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. A fluid flow detection switch comprising:
    a tubular housing;
    a movable member positioned within said housing and influenced by fluid flow through said housing;
    a permanent magnet carried by said movable member; and
    a sensing means influenced by the permanent magnet for detecting the absence of fluid flow through said tubular housing, said sensing means comprises an optical shutter positionable by influence from said permanent magnet when said magnet is in close proximate therewith and a pair of fiber optic cables, one of said cables providing a source of light to one side of said shutter and the other one receiving light therefrom when said shutter is in a certain shutter position.

2. The invention is defined in claim 1 wherein said tubular housing is constructed of non-ferrous material.

3. The invention as defined in claim 1 wherein said tubular housing is constructed of copper.

4. The invention as defined in claim 1 wherein said tubular housing is constructed of plastic.

5. The invention as defined in claim 1 wherein said tubular housing is constructed of rubber.

6. The invention as defined in claim 1 wherein said movable member is an elongated flexible member having a distal end and an opposite end connected within said housing the longitudinal evaluation of said distal and of said flexible member being influenced by unidirectional fluid flow through said housing.

7. The invention as defined in claim 1 wherein said movable member is attached to an open ring member constructed of resilient material, when said ring member and said movable member are positioned within said housing said movable member is maintained in a fixed longitudional location.

8. The invention as defined in claim 6 wherein said permanent magnet is attached to the distal end of said flexible member.

9. The invention as defined in claim 1 wherein said optical shutter is positioned external of said housing and comprises a disk with an aperture therethrough constructed of a ferrous material.

10. The invention as defined in claim 9 wherein said optical shutter further comprises a housing having an inner member with an elongated vertical slot which carries said disk, a bore perpendicular to said slot which aligns with the aperture in said disk when said disk is in its maximum slot elevated position, an outer sleeve housing for enclosing said inner member, said outer sleeve housing having a bore therethrough which aligns with the bore through said inner member.

11. The invention as defined in claim 10 wherein said fiber optic cables are inserted through said bores on each side of said vertical slot.

12. The invention as defined in claim 1 wherein said movable member comprises a permanent magnet gate pivotally attached within said housing, the elevation of said gate is influenced by the flow of fluid through said housing.

13. The invention as defined in claim 12 wherein said gate is pivotally attached to an open ring member constructed of resilient material inserted within said housing.

14. The invention as defined in claim 1 wherein said shutter is positioned within said housing and comprises a cylinder member extending exteriorly from the bottom surface of said housing, a cylindrical permanent magnet freely translatable within said cylinder member, said cylinder is positioned adjacent said permanent magnet and the vertical position of said cylindrical permanent magnet is influenced by the position of said permanent magnet, said pair of fiber optic cables are positioned so that light is transmitted from one to the other only when said cylindrical permanent magnet is positioned in front of said cables.

15. The invention as defined in claim 14 wherein the degree of rise and fall of said cylindrical permanent magnet can be selectively adjusted by means of a third permanent magnet whose poles are positioned in the opposite manner as said cylindrical permanent magnet positioned on the exterior end of said cylindrical member remote from said bottom surface of said housing and adjustable in and out of said cylindrical member.

16. The invention as defined in claim 14 wherein said cylindrical permanent magnet has areas of different reflection characteristics whereby the vertical position of said cylindrical permanent magnet can be determined by the amount of light reflected from said cylindrical permanent magnet from one fiber optic cable to the other.

17. The invention as defined in claim 1 wherein said movable member moves from said first position to said second position in a direction co-axial with said housing by the unidirectional fluid flow through said housing.

18. The invention as defined in claim 17 wherein biasing means biases said movable member in said first position in the absence of fluid flow.

19. The invention as defined in claim 18 wherein said biasing means is a second permanent magnet fixedly positioned in said housing and is co-axial with said permanent magnet carried by of said movable member adjacent to said second permanent magnet, the adjacent magnetic poles of said permanent magnets are the same.

20. The invention as defined in claim 17 wherein said movable member is a permanent magnet.

21. A fluid flow detector comprising:
    a housing through which fluid flows:
    an open ended vertical housing with one end communicating with the fluid flow through said housing;

a movable member positioned within said vertical housing member and pivotally connected thereto;

a permanent magnet carried by said movable member;

a cylindrical tube which extends through the open end of said vertical housing transverse thereto;

a cylindrical permanent magnet freely translatable within said cylindrical tube by influence from said permanent magnet;

a float means in said vertical housing member for moving said movable member in response to fluid level in said vertical housing member, due to fluid flow in said housing;

a first light transmitting fiber optic cable;

a second light receiving fiber optic cable;

whereby the flow of fluid through said housing elevates the level of said fluid and said float means in said vertical housing member thereby moving said movable member and said permanent magnet, the movement of said permanent magnet translates said cylindrical permanent magnet accordingly varying the level of light from said first fiber optic cable reflected from said cylindrical permanent magnet surface to said second fiber optic cable.

22. The invention as defined in claim 21 wherein said first and second fiber optic cables are positioned in one end of said cylindrical tube and the light from said first optic cable is reflected from one end of said cylindrical magnet.

23. The invention as defined in claim 21 wherein said first and second fiber optic cables are positioned so that light is transferred from said first fiber optic cable to said second optic cable at all translation positions of said cylindrical permanent magnet and the longitudinal body portion of said cylindrical permanent magnet has varying degree of reflectivity therealong.

24. The invention as defined in claim 21 further comprising an adjustable cylindrical permanent magnet translation biasing means.

25. A fluid level detection device comprising:

a cylindrical vertical housing filed with a clear liquid;

a float member within said vertical housing, said float member has a permanent magnet located on its uppermost surface, the upper surface of said permanent magnet is a light reflective surface;

a ring shaped float with an inner ring shaped permanent magnet, said ring shaped permanent magnet having a central aperture slightly larger than the diameter of said cylindrical vertical housing;

said permanent magnet and ring shape permanent magnets have opposite poles when said ring shaped permanent magnet is operably positioned over said cylindrical vertical housing adjacent said permanent magnet therein;

a first light transmitting fiber optic cable;

a second light receiving fiber optic cable;

whereby when said cylindrical vertical housing is at least partially emersed in said fluid in a plumb vertical position with said ring float and ring permanent magnet therearound, the level of said fluid influences the position of said ring float and ring permanent magnet which positions said permanent magnet in said housing causing the light from one of said first optic cable to be reflected from said light reflective surface with different intensities for different liquid levels.

26. The invention as defined in claim 25 wherein said clear fluid has a viscosity which dampens the free movement of said float member therein.

27. The invention as defined in claim 25 wherein the central aperture in said ring permanent magnet is sized relative to the diameter of said cylindrical vertical housing so that said ring shaped magnet will bind on said vertical housing when the surface of said fluid is uneven in a pre-determined degree.

* * * * *